(12) United States Patent
Kim et al.

(10) Patent No.: US 8,937,411 B2
(45) Date of Patent: Jan. 20, 2015

(54) VIBRATION GENERATING DEVICE

(71) Applicant: Samsung Electro-Mechanics Co., Ltd., Gyunggi-do (KR)

(72) Inventors: Yong Tae Kim, Gyunggi-do (KR); Je Hyun Bang, Gyunggi-do (KR); Jung Taek Hong, Gyunggi-do (KR); Dong Su Moon, Gyunggi-do (KR)

(73) Assignee: Samsung Electro-Mechanics Co., Ltd., Suwon, Gyunggi-Do (KR)

( * ) Notice: Subject to any disclaimer, the term of this patent is extended or adjusted under 35 U.S.C. 154(b) by 237 days.

(21) Appl. No.: 13/683,419

(22) Filed: Nov. 21, 2012

(65) Prior Publication Data

US 2014/0062224 A1    Mar. 6, 2014

(30) Foreign Application Priority Data

Sep. 6, 2012 (KR) .................. 10-2012-0098829

(51) Int. Cl.
*H02K 33/00* (2006.01)
*H02K 33/02* (2006.01)
*H02K 33/16* (2006.01)

(52) U.S. Cl.
CPC .............. *H02K 33/02* (2013.01); *H02K 33/16* (2013.01)
USPC .............................. 310/15; 310/25

(58) Field of Classification Search
USPC ................ 310/15, 21, 25, 29, 32, 81
See application file for complete search history.

(56) References Cited

U.S. PATENT DOCUMENTS

| | | | | |
|---|---|---|---|---|
| 4,831,292 | A * | 5/1989 | Berry | 310/15 |
| 5,980,211 | A * | 11/1999 | Tojo et al. | 417/45 |
| 6,815,847 | B2 * | 11/2004 | Duncan et al. | 310/12.24 |
| 6,873,067 | B2 * | 3/2005 | Ichii et al. | 310/15 |
| 7,078,832 | B2 * | 7/2006 | Inagaki et al. | 310/12.19 |
| 2002/0195884 | A1 * | 12/2002 | Ichii et al. | 310/15 |
| 2003/0142845 | A1 | 7/2003 | Miyamoto et al. | |
| 2007/0040457 | A1 * | 2/2007 | Shimizu et al. | 310/15 |
| 2007/0145832 | A1 * | 6/2007 | Shimizu et al. | 310/15 |
| 2011/0198948 | A1 * | 8/2011 | Keisuke et al. | 310/25 |
| 2011/0198949 | A1 * | 8/2011 | Furuich et al. | 310/25 |
| 2014/0001889 | A1 * | 1/2014 | Hong | 310/25 |

FOREIGN PATENT DOCUMENTS

| | | | |
|---|---|---|---|
| JP | 2003-117489 A | 4/2003 | |
| JP | 2003-220363 A | 8/2003 | |

* cited by examiner

*Primary Examiner* — Thanh Lam
(74) *Attorney, Agent, or Firm* — McDermott Will & Emery LLP

(57) ABSTRACT

There is provided a vibration generating device, including: a housing including an inner space; a shaft provided in the inner space of the housing in an axial direction; a frame including a shaft hole into which the shaft is fitted; a bearing member mounted on the frame to be vibrated in a state of contact with the shaft; a vibrating part mounted on an outer surface of the frame and including a magnetic field generation part; elastic members mounted on both ends of the vibrating part in the axial direction; and a coil provided in the inner space and vibrating the vibrating part by interaction with the magnetic field generation part.

15 Claims, 8 Drawing Sheets

VIBRATION GENERATING DEVICE

CROSS-REFERENCE TO RELATED APPLICATIONS

This application claims the priority of Korean Patent Application No. 10-2012-0098829 filed on Sep. 6, 2012, in the Korean Intellectual Property Office, the disclosure of which is incorporated herein by reference.

BACKGROUND OF THE INVENTION

1. Field of the Invention

The present invention relates to a vibration generating device.

2. Description of the Related Art

A vibration generating device, a component which converts electrical energy into mechanical vibrations using a generation principle of electromagnetic force, is mounted in a cellular phone, and the like, to be used for silently informing a user of call receipt.

Further, there is a growing demand for multi-functional electronic devices, as the market for electronic devices such as a cellular phones, and the like, is rapidly expanded. Since demand for small and high-quality components for electronic devices is increasing according to the expanded market therefor, demand for product development of a vibration generating device having a new structure capable of remarkably improving quality while improving disadvantages of existing products has increased.

As cellular phones having a large LCD screen have increasingly been released onto the market in recent years, a vibration generating device for generating vibrations at the time of a touch has been adopted, due to the use of a touch screen type.

First, a vibration generating device used in a touch screen type electronic device is more frequently used than providing vibrations at the time of a user receiving a call and therefore, needs to have a long lifespan. Second, a vibration generating device needs to have a rapid response speed meeting a user's speed of touching a touch screen.

An electronic device such as a cellular phone using a touch screen has used a linear vibrator to meet the demand for a long lifespan and rapid responsiveness.

A linear vibrator does not use rotation of a motor to generate vibrations, but is vibrated by electromagnetic force having a resonance frequency determined by an elastic member mounted in a vibrator and a weight body connected to the elastic member to generate vibrations.

As the size of the electronic device is reduced, the linear vibrator needs to be miniaturized. However, since the linear vibrator should include essential components, there may be limitations on the miniaturization of the linear vibrator. Therefore, a need exists for a linear vibrator having a novel structure capable of making a disposition relationship of components efficient.

In addition, the linear vibrator has excellent vibration responsiveness but needs to immediately stop vibrating when vibration factors disappear. However, the existing linear vibrator has a limitation in terms of stopping performance.

SUMMARY OF THE INVENTION

An aspect of the present invention provides a linear vibrator having a reduced size by efficiently improving a disposition of components in a linear vibrator.

Another aspect of the present invention provides a linear vibrator capable of immediately stopping vibrating of a linear vibrator when vibration factors disappear.

According to an aspect of the present invention, there is provided a vibration generating device, including: a housing including an inner space; a shaft provided in the inner space of the housing in an axial direction; a frame including a shaft hole into which the shaft is fitted; a bearing member mounted on the frame to be vibrated in a state of contact with the shaft; a vibrating part mounted on an outer surface of the frame and including a magnetic field generation part; elastic members mounted on both ends of the vibrating part in the axial direction; and a coil provided in the inner space and vibrating the vibrating part by interaction with the magnetic field generation part.

The coil may be disposed on an upper or lower portion of the housing in the axial direction.

At least one of both ends of the coil in the axial direction may be provided with a yoke formed of a magnetic material.

The coil may be provided on an inner surface of the housing to be disposed in the inner space.

The coil may include a first coil and a second coil.

At least one of both ends of the first coil and the second coil in the axial direction may be provided with a yoke formed of a magnetic material.

The first coil and the second coil may be continuously disposed in the axial direction, and the yoke may be disposed between the first coil and the second coil.

The bearing member may be provided on both ends of the frame.

The bearing member may be disposed such that an outer surface thereof contacts an inner circumferential surface of the frame and an inner circumferential surface thereof contacts the shaft.

The vibrating part may include a weight body.

The frame may be vibrated in a state of being spaced apart from the shaft by a predetermined interval.

The magnetic field generation part may include a magnet.

At least one of both ends of the magnet may be provided with a yoke formed of a magnetic material.

According to another aspect of the present invention, there is provided a vibration generating device, including: a housing including an inner space; a shaft provided in the inner space of the housing in an axial direction; a frame including a shaft hole into which the shaft is fitted; a bearing member mounted on the frame to be vibrated in a state of contact with the shaft; a vibrating part mounted on an outer surface of the frame and including elastic members mounted on both ends thereof in the axial direction and a magnetic field generation part; a coil mounted in the inner space and vibrating the vibrating part by interaction with the magnetic field generation part; and a vibration stopping unit helping the vibrating part to stop vibrating when current applied to the coil is cut off.

The vibration stopping unit may be mounted on at least one end of the coil.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Hereinafter, embodiments of the present invention will be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art.

Figure 1:
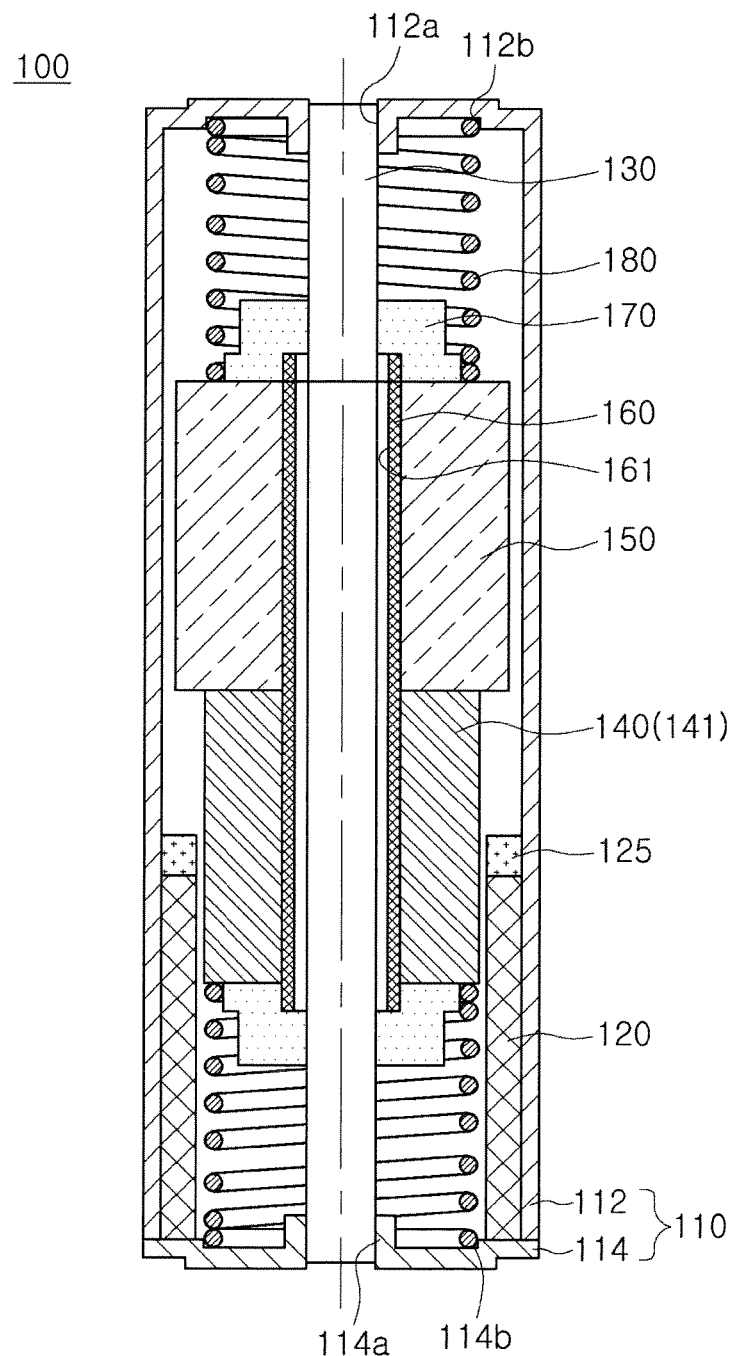
FIG. 1 is a combined cross-sectional view of a vibration generating device according to an embodiment of the present invention.
Figure 2:
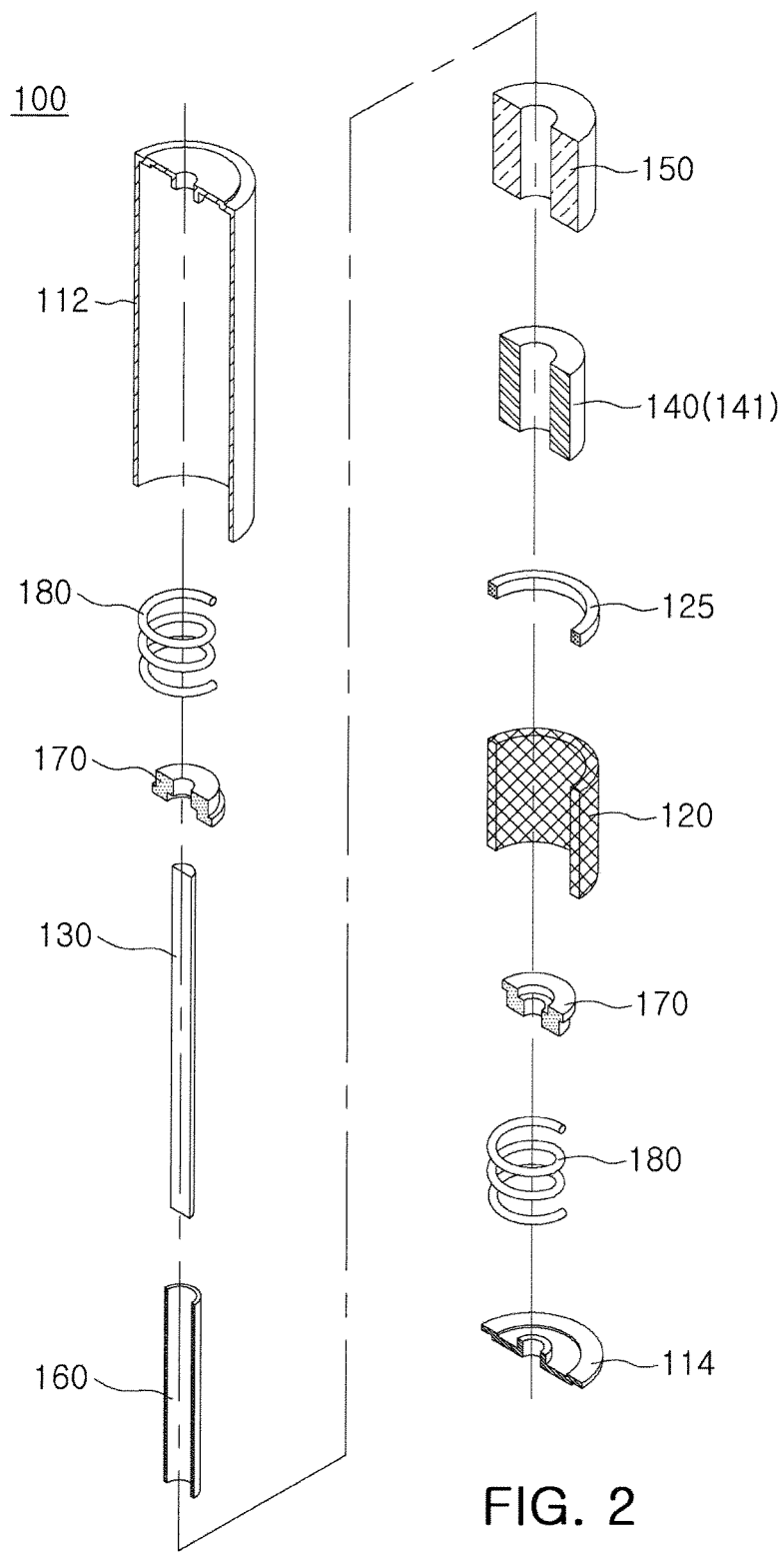
FIG. 2 is a partially cut-away exploded perspective view of a vibration generating device according to an embodiment of the present invention.

FIG. 1 is a combined cross-sectional view of a vibration generating device according to an embodiment of the present invention and FIG. 2 is an exploded perspective view of the vibration generating device according to the embodiment of the present invention.

Referring to FIGS. 1 and 2, a vibration generating device 100 according to an embodiment of the present invention may include, for example, a housing 110, a coil 120, a shaft 130, a magnetic field generation part 140, a weight body 150, a frame 160, a bearing member 170, and an elastic member 180. Further, the configuration of the vibration generating device is only an example of the present invention and therefore, some components may be excluded or other components may additionally be provided therein.

First, when defining terms for a direction, an axial direction (a longitudinal direction) refers to a vertical direction, that is, a direction from one portion of the housing 110 toward the other portion thereof or from the other portion of the housing 110 toward one portion thereof as depicted in FIG. 1 and a radial direction (a width direction) refers to a horizontal direction as depicted in FIG. 1.

Further, a circumferential direction refers to a direction of rotation along an inner circumferential surface or an outer surface of a predetermined member based on a longitudinal central axis.

The housing 110 has an inner space and forms an exterior of the vibration generating device 100. The housing 110 may include a case 112 that has an opened portion and has an inner space and a bracket 114 that is combined with one portion of the case 112 to shield an inner space.

The case 112 may be formed of a magnetic material to prevent external magnetic leakage while forming a magnetic closed circuit. However, the embodiment of the present invention is not limited thereto and the case 112 maybe formed of a non-magnetic material.

The case 112 maybe formed by a firing working of a steel sheet (for example, press working, and the like) and may also be formed by a die casting method.

Further, both ends of an inner surface of the housing 110 forming the inner space may be provided with fitting parts 112a and 114a. The fitting parts 112a and 114a may be formed to have a groove shape or a hole shape. The fitting parts 112a and 114a are each fitted with both ends of the shaft 130.

Further, both ends of the inner surface of the housing 110 forming the inner space may be provided with guide grooves 112b and 114b. The case 112 may be provided with the guide groove 112b into which an end of the elastic member 180 is inserted and the bracket 114 may be provided with the guide groove 114b into which an end of the elastic member 180 is inserted. The guide groove 112b of the case 112 may be simply formed during the firing working or the die casting process of the steel sheet.

The bracket 114 may be formed of a metal material to be firmly fixed to the case 112 and may be manufactured by the firing working, the die casting process, and the like. However, the embodiment of the present invention is not limited thereto and therefore, the bracket 114 may be manufactured by injection molding using a synthetic resin. Meanwhile, the bracket 114 may be provided with the guide groove 114b into which the end of the elastic member 180 is inserted.

In this configuration, at least any one of both ends of the inner surface of the housing 110 forming the inner space and both ends of a vibrating part including the magnetic field generation part 140 and the weight body 150 to be described below may be provided with a damper (not shown). That is, an impact absorbing member may be disposed against a case in which the vibrating part contacts the inner space of the housing 110 during the horizontal vibration of the vibrating part within the inner space.

The coil 120 may be disposed in the inner space of the housing 110. As an example, the coil 120 may be disposed on an inner circumferential surface of the case 112 along a circumferential direction thereof. That is, the coil 120 may enclose the inner circumferential surface of the case 112.

Further, the coil 120 may have a cylindrical shape and a magnet 141 may be vibrated inside the coil 120 in the axial direction at the time of the vibration of the vibrating part including the magnetic field generation part 140 and the weight body 150.

That is, the coil 120 serves to generate driving force that vibrates the vibrating part by electromagnetic interaction with the magnetic field generation part 140.

Further, the coil 120 needs to be connected to an external power supply to supply power. Therefore, the coil 120 includes a lead wire (not shown) that is drawn to a lead-out hole (not shown) provided in the housing 110 and the lead wire may be connected to the substrate (not shown) separately provided to have power applied thereto.

In addition, the coil 120 may be disposed in an upper or lower portion of the inner space of the housing 110 in the axial direction. The magnetic field generation part 140 including the magnet may be disposed in the same direction as that of the coil 120. Therefore, the coil 120 may be disposed to facilitate interaction with the magnetic field generation part 140.

In addition, at least one of both ends of the coil 120 may be provided with a yoke 125 formed of a magnetic material. In particular, one of both ends of the coil 120 at which a portion overlapping the magnet in the axial direction is formed may be provided with the yoke 125. The yoke 125 formed of a magnetic material may serve as a vibration stopping unit helping the vibrating part including the magnetic field generation part 140 and the weight body 150 to stop vibrating when the supply of power to the coil 120 is stopped, by forming magnetic force between the yoke 125 and the magnetic field generation part 140 including the magnet. That is, residual vibration generation maybe suppressed as much as possible and the stopping response speed of the linear vibrator may be maximized.

The shaft 130 may be mounted in the housing 110 by (that is, the vertical direction of FIG. 1) crossing the inner space of the housing 110 in the axial direction. That is, the fitting parts 112a and 114A provided in the housing 110 may be fitted into both ends of the shaft 130.

The shaft 130 may serve to guide the vibration of the vibrating part in the linear vibrator according to the embodiment of the present invention.

The magnetic field generation part 140 may be disposed in an upper or lower portion of the inner space of the housing 110. Therefore, as described above, the coil 120 may be disposed in the inner space of the housing 110 in the same direction as that of the magnetic field generation part 140. Further, one end of the magnetic field generation part 140 may be combined with the weight body 150 and the other end thereof may be disposed to face the coil 120. The magnetic field generation part 140 generates vibration driving force by electromagnetic interaction between the magnet 141 included therein and the coil 120 provided in the housing 110.

Meanwhile, the magnet 141 has a cylindrical shape and an N pole may be magnetized on one portion thereof and an S pole may be magnetized on the other portion thereof in the axial direction.

In this case, a mechanism of the generation of driving force by the magnet 141 will be briefly described.

First, when power is supplied to the coil 120, driving force is generated by the electromagnetic interaction between the coil 120 and the magnet 141. In this case, the coil 120 is supplied with AC current and therefore, the driving force generated by the coil 120 and the magnet 141, that is, force exerted upwardly and force exerted downwardly are alternately generated in the axial direction. Therefore, the magnet 141 may be vibrated in the axial direction.

One end (an opposite direction to a direction in which the magnetic field generation part 140 is mounted in the inner space of the housing 110) of the magnetic field generation part 140 including the magnet 141 may be combined with the weight body 150. That is, the weight body 150 is mounted on one end of the magnetic field generation part 140 such that they may vibrate together.

In the embodiment of the present invention, the weight body 150 serves to be continuously vibrated when the driving force is generated by the electromagnetic interaction between the coil 120 and the magnet 141. To this end, the weight body 150 may be formed of a material having a high specific gravity. For example, the weight body 150 may be formed of a copper alloy such as brass, a non-magnetic material, or tungsten.

Here, at least a portion of the magnet 141 may be disposed to face the inner circumferential surface of the housing 110 while having the coil 120 therebetween. However, the weight body 150 directly faces the inner circumferential surface of the housing 110 and therefore, a diameter of the weight body 150 may be provided to be larger than that of the magnet 141.

Here, the magnetic field generation part 140 and the weight body 150 may be a vibrating part that is vibrated relatively to a stationary part. Further, the frame 160 to be described below may have the vibrating part provided on an outer surface thereof such that it may be vibrated together with the vibrating part, and therefore, it may be included in the vibrating part.

The frame 160 may have the magnetic field generation part 140 and the weight body 150 mounted on the outer circumferential surface thereof. That is, the frame 160 may be integrally provided with the vibrating part to facilitate the assembling of the linear vibrator. The frame 160 may have a cylindrical shape. The frame 160 may be formed of a magnetic material or a non-magnetic material.

The frame 160 has the magnetic field generation part 140 and the weight body 150 mounted on the outer surface thereof, and an inner circumferential surface thereof may face the outer surface of the shaft 130. Therefore, the frame 160 may have a shaft hole 161 in the axial direction. Meanwhile, since the frame 160 does not directly contact the shaft 130, a diameter of the shaft hole 161 may be larger than that of the shaft 130.

A bearing member 170 may be mounted on the frame 160. The bearing member 170 may be vibrated in a state in which the bearing member 170 contacts the outer surface of the shaft 130. That is, the bearing member 170 may be slidably mounted on the shaft 130. That is, the bearing member 170 may move along the shaft 130 in the axial direction (that is, the vertical direction in FIG. 1) by the interaction between the magnet 141 and the coil 120.

The bearing member 170 may be provided on both ends of the frame 160 such that the frame 160 may be spaced apart from the shaft 130 by a predetermined interval.

The bearing member 170 has an inner circumferential surface having a circular shape such that it may slidably move along the outer surface of the shaft 130.

Meanwhile, the bearing member 170 may configure the vibrator that is vibrated relatively to a stator, together with the magnetic field generation part 140 and the weight body 150.

Ends of the elastic members 180 may be fixed to the housing 110 and the other ends thereof may be fixed to the vibrating part such that the elastic members 180 may additionally provide vibration force to the vibrating part.

The elastic member 180 may generate elastic force in the axial direction. Therefore, the elastic member 180 may be a coil spring or a leaf spring. However, the embodiment of the present invention is not limited thereto, and any spring may be used so long as it may secure elastic force.

The elastic member 180 may be disposed so that the shaft 130 penetrates through a center thereof in the axial direction. This is to prevent vibration from being generated in a radial direction while axial vibration is generated at the time of the vibration of the vibrating part.

The elastic member 180 may be disposed such that one end thereof may be fitted into the guide grooves 112b and 114b of the housing 110 and the other end thereof may enclose the bearing member 170 and may be supported by the vibrating part (the magnetic field generation part 140 or the weight body 150). Alternatively, the end of the elastic member 180 may be supported by the bearing member 170 while enclosing the bearing member 170.

As a result, the vibrator configured of the magnetic field generation part 140, the weight body 150, and the frame 160 maybe vibrated in the axial direction in the state in which both ends thereof are hung on the elastic members 180 in the housing 110.

FIGS. 3 through 8 are combined cross-sectional views of a vibration generating device according to another embodiment of the present invention.

Figure 3:
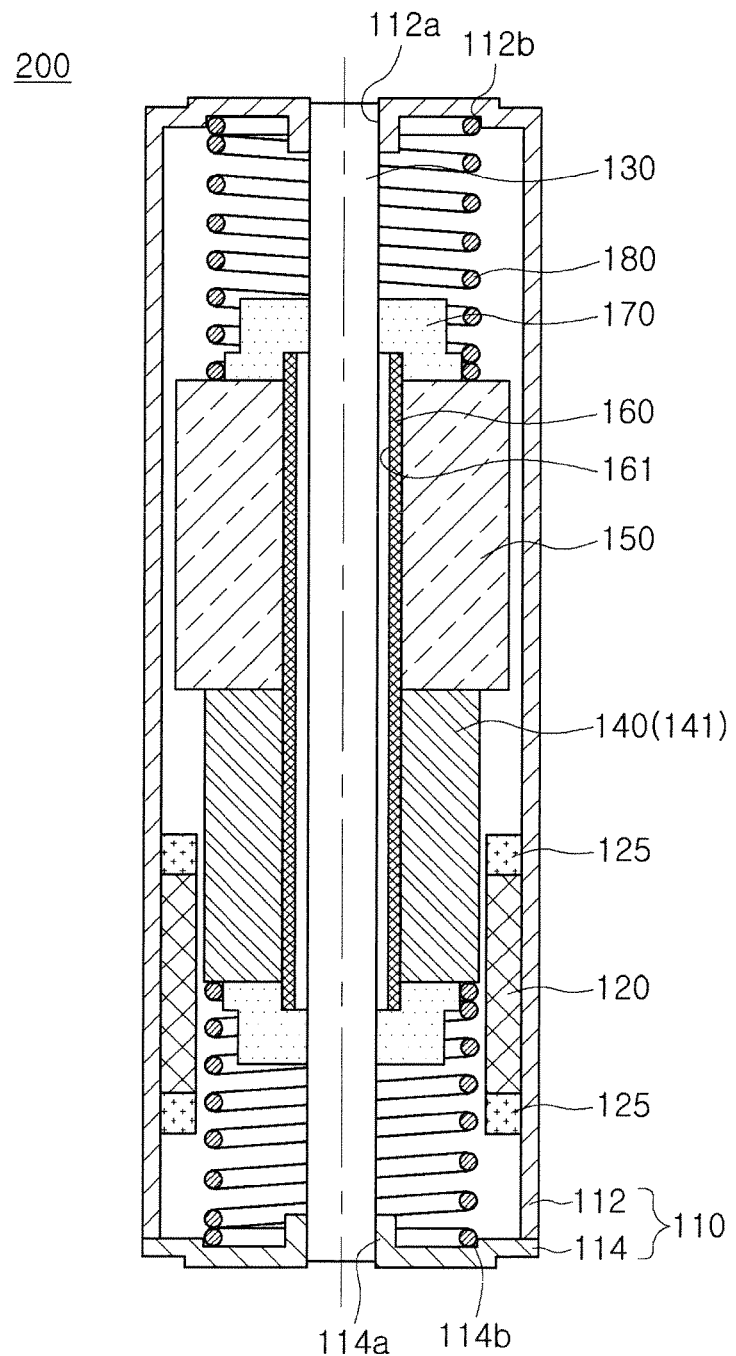
FIGS. 3 through 8 are combined cross-sectional views of a vibration generating device according to another embodiment of the present invention.

Referring to FIG. 3, a vibration generating device 200 according to another embodiment of the present invention may include, for example, a housing 110, a coil 120, a shaft 130, a magnetic field generation part 140, a weight body 150, a frame 160, a bearing member 170, and an elastic member 180. Further, the configuration of the vibration generating device 200 is only an example of the present invention, and some components may be excluded or other components may additionally be provided therein.

In this case, the vibration generating device 200 according to another embodiment of the present invention is different from the vibration generating device 100 described with reference to FIGS. 1 and 2, in that the yoke 125 is mounted on both ends of the coil 120. Therefore, different components will be mainly described and the same components as those described in the aforementioned embodiment with reference to FIGS. 1 and 2 will be omitted.

The coil 120 may be disposed in the inner space of the housing 110. As an example, the coil 120 may be disposed on an inner circumferential surface of a case 112 along a circumferential direction thereof. That is, the coil 120 may be disposed to enclose the inner circumferential surface of the case 112.

In addition, the coil 120 may be disposed in an upper or lower portion of the inner space of the housing 110 in the axial direction. The magnetic field generation part 140 including the magnet may be disposed in the same direction as that of the coil 120. Therefore, the coil 120 may be disposed to facilitate interaction with the magnetic field generation part 140.

Further, an end of the coil 120 may be spaced apart from an end of the housing 110 by a predetermined interval in the axial direction.

In addition, both ends of the coil 120 may be provided with the yoke 125 formed of a magnetic material. The yoke 125 formed of a magnetic material may serve as a vibration stopping unit helping the vibrating part including the magnetic field generation part 140 and the weight body 150 to stop vibrating when the supply of power to the coil 120 is stopped, by forming magnetic force between the yoke 125 and the magnetic field generation part 140 including the magnet. That is, residual vibration generation may be suppressed as much as possible and the stopping response speed of the linear vibrator may be maximized.

Figure 4:
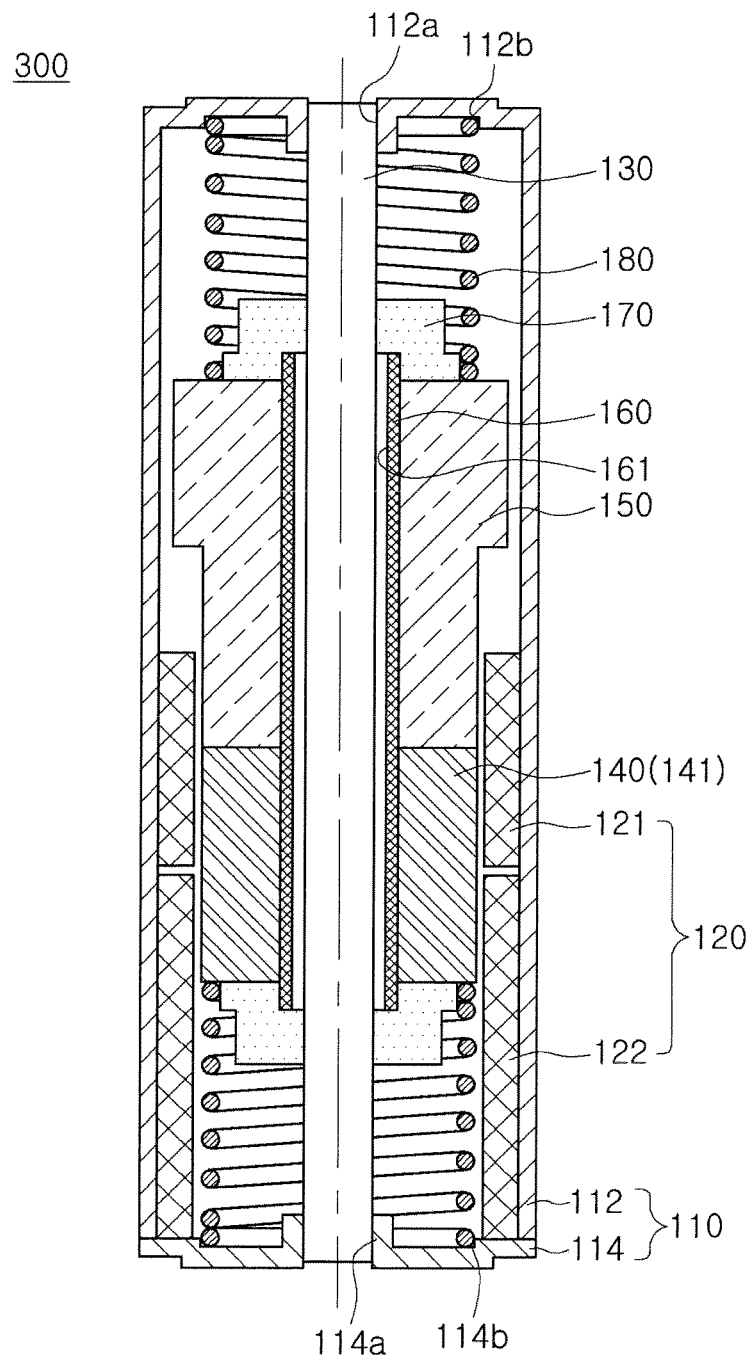
Figure 5:
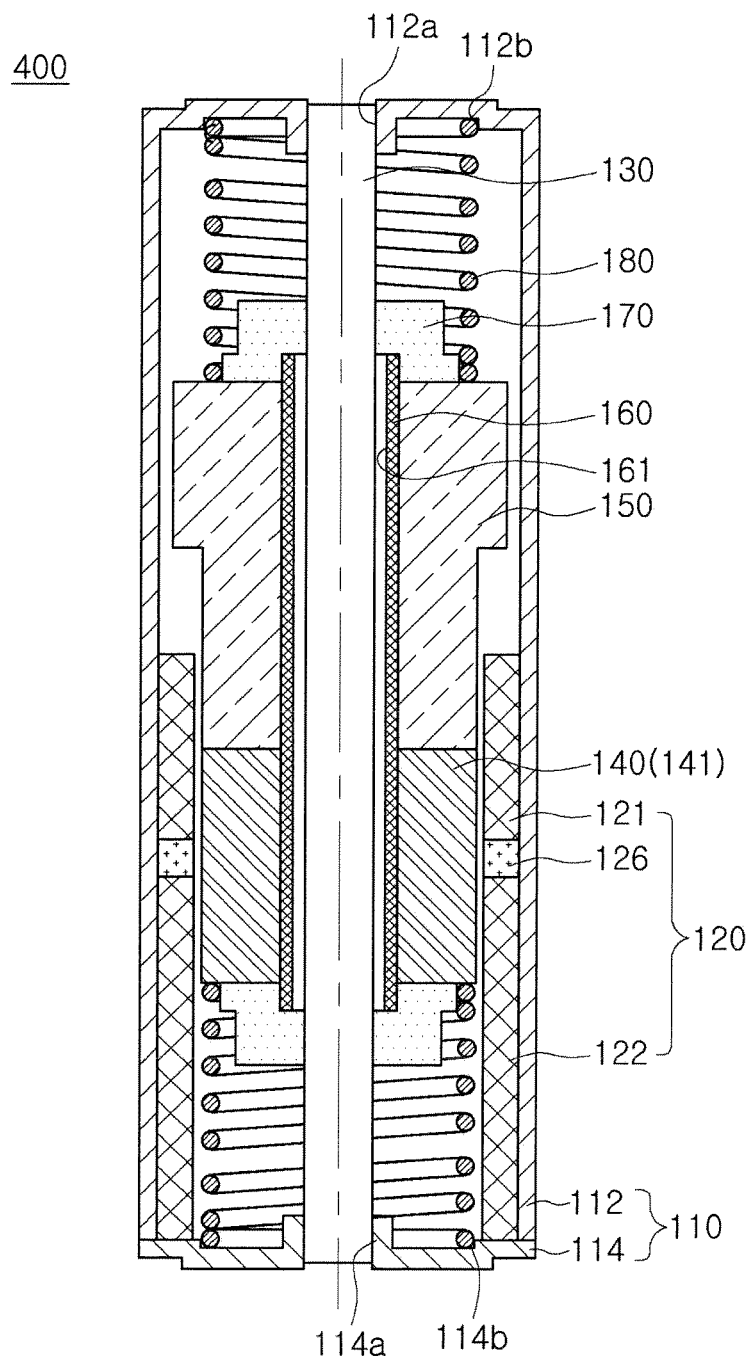
Figure 6:
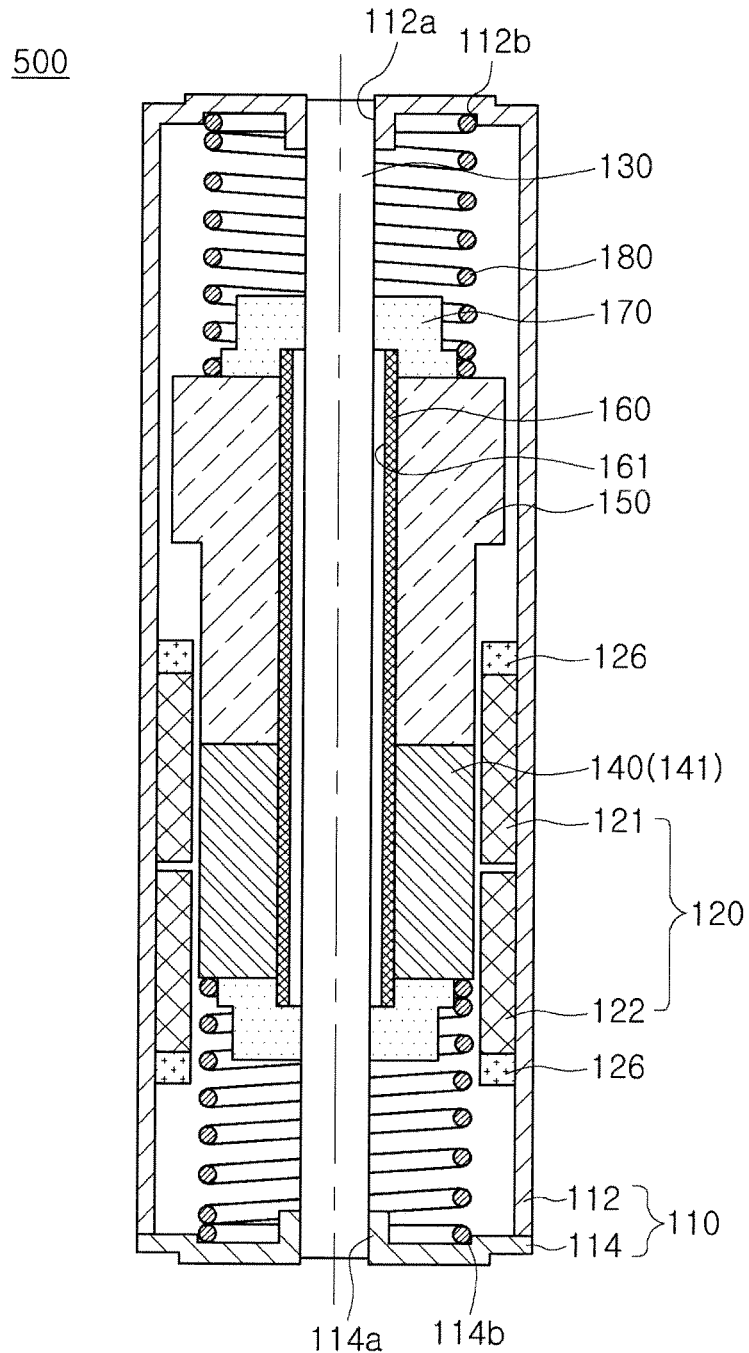

Referring to FIGS. 4 through 6, a vibration generating device 300, 400, or 500 according to another embodiment of the present invention may include, for example, a housing 110, a coil 120, a shaft 130, a magnetic field generation part 140, a weight body 150, a frame 160, a bearing member 170, and an elastic member 180. Further, the configuration of the vibration generating device 300, 400, or 500 is only an example of the present invention, and some components may be excluded or other components may additionally be provided therein.

In this case, the vibration generating device 300, 400, or 500 according to another embodiment of the present invention is different from the vibration generating device 100 described with reference to FIGS. 1 and 2, in terms of the disposition of the coil 120 and the yoke 126. Therefore, different components will be mainly described and the same components as those described in the aforementioned embodiment with reference to FIGS. 1 and 2 will be omitted.

The coil 120 may be disposed in the inner space of the housing 110. As an example, the coil 120 may be disposed on an inner circumferential surface of a case 112 along a circumferential direction thereof. That is, the coil 120 may be disposed to enclose the inner circumferential surface of the case 112.

In addition, the coil 120 may be disposed in an upper or lower portion of the inner space of the housing 110 in the axial direction. The magnetic field generation part 140 including the magnet may be disposed in the same direction as that of the coil 120. Therefore, the coil 120 may be disposed to facilitate interaction with the magnetic field generation part 140.

In addition, the coil 120 may include a first coil 121 and a second coil 122. That is, the first coil 121 and the second coil 122 may be disposed to be spaced apart from each other by a predetermined interval in the axial direction (see FIG. 4).

In addition, at least one of both ends of the first coil 121 and the second coil 122 in the axial direction may be provided with a yoke 126 formed of a magnetic material.

In addition, the first coil 121 and the second coil 122 are adjacently disposed in the axial direction and the yoke 126 may be disposed between the first coil 121 and the second coil 122 (see FIG. 5).

In addition, of the first and second coils 121 and 122, the second coil 122 is disposed outwardly in the axial direction, and an end thereof may be disposed in the inner space to be spaced apart from an end of the housing 110 by a predetermined interval in the axial direction.

In addition, an inner end of the first coil 121 and an outer end of the second coil 122 may be respectively provided with the yokes 126 of a magnetic material (see FIG. 6). The yoke 126 formed of a magnetic material may serve as a vibration stopping unit helping the vibrating part including the magnetic field generation part 140 and the weight body 150 to stop vibrating when the supply of power to the coil 120 is stopped, by forming magnetic force between the yoke and the magnetic field generation part 140 including the magnet. That is, residual vibration generation may be suppressed as much as possible and the stopping response speed of the linear vibrator may be maximized.

Figure 7:
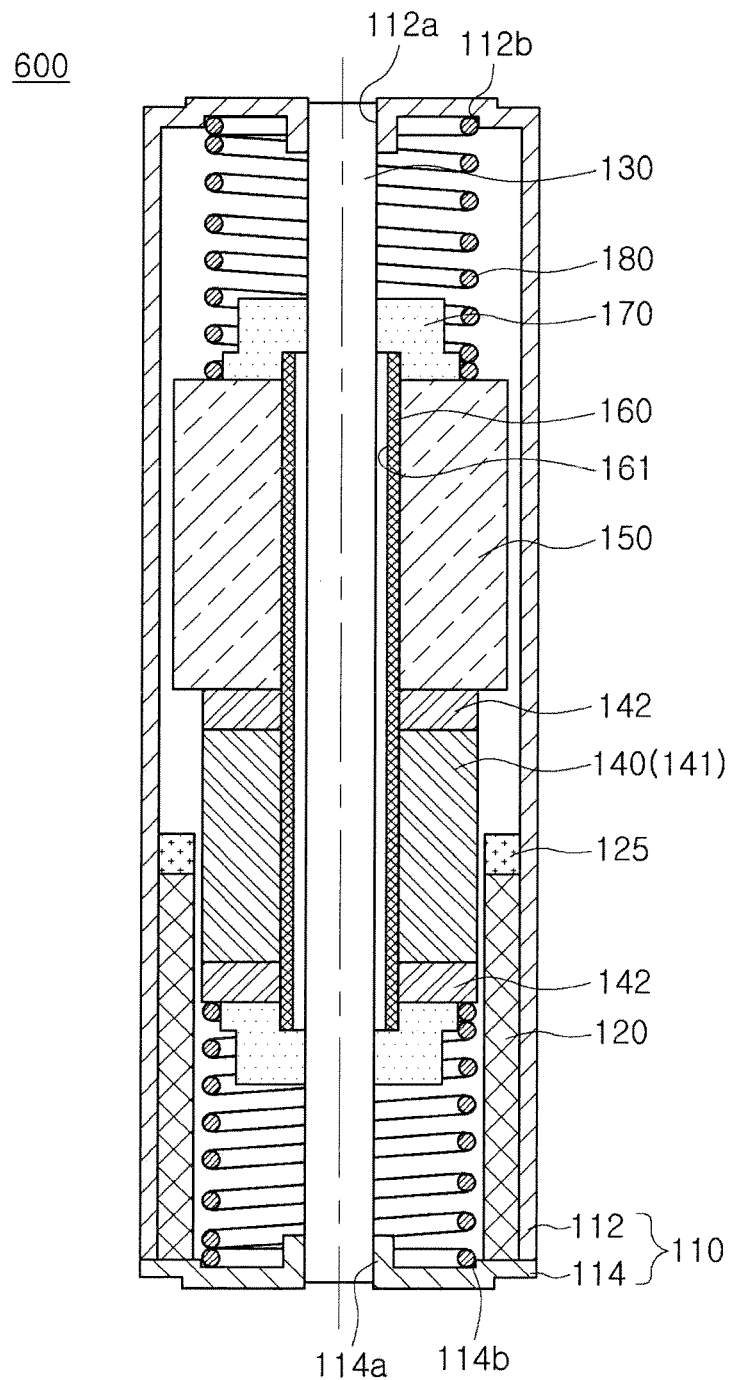

Referring to FIG. 7, a vibration generating device 600 according to another embodiment of the present invention may include, for example, a housing 110, a coil 120, a shaft 130, a magnetic field generation part 140, a weight body 150, a frame 160, a bearing member 170, and an elastic member 180. Further, the configuration of the vibration generating device 600 is only an example of the present invention, and some components may be excluded or other components may additionally be provided therein.

In this case, a vibration generating device 600 according to another embodiment of the present invention is different from the vibration generating device 100 described with reference to FIGS. 1 and 2, in that a yoke 142 is disposed adjacently to a magnet 141. Therefore, different components will mainly be described, and the same components as those described in the aforementioned embodiment with reference to FIGS. 1 and 2 will be omitted.

The magnetic field generation part 140 may be disposed in an upper or lower portion of the inner space of the housing 110. The magnetic field generation part 140 generates vibration driving force by electromagnetic interaction between the magnet 141 included therein and the coil 120 mounted in the housing 110.

The magnet 141 may be provided with the yoke 142 disposed in both ends or a center thereof in the axial direction. The yoke 142 may be formed of a magnetic material.

In FIG. 7, the yokes 142 are mounted on both ends of the magnet 141, but the embodiment of the present invention is not limited thereto. The yoke 142 maybe disposed in the center of the magnet 141 in the axial direction.

Figure 8:
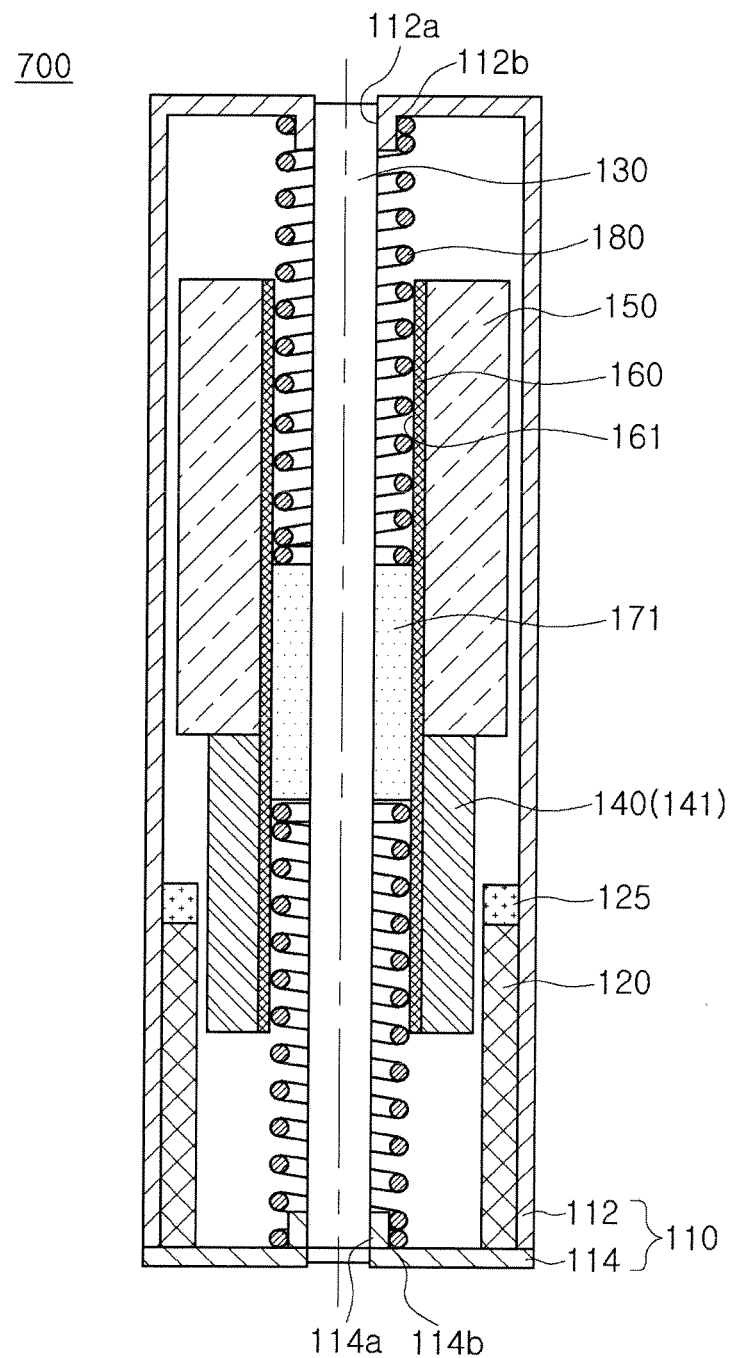

Referring to FIG. 8, a vibration generating device 700 according to another embodiment of the present invention may include, for example, a housing 110, a coil 120, a shaft 130, a magnetic field generation part 140, a weight body 150, a frame 160, a bearing member 171, and an elastic member 180. Further, the configuration of the vibration generating device 700 is only an example of the present invention, and some components may be excluded or other components may additionally be provided therein.

In this case, the vibration generating device 700 according to another embodiment of the present invention is different from the vibration generating device 100 described with reference to FIGS. 1 and 2, in terms of the disposition of the bearing member 171. Therefore, different components will be mainly described and the same components as those described in the aforementioned embodiment with reference to FIGS. 1 and 2 will be omitted.

The bearing member 171 may be mounted on the frame 160. The bearing member 171 may be vibrated in a state in which the bearing member 170 contacts an outer surface of the shaft 130. That is, the bearing member 171 may be slidably mounted on the shaft 130. That is, the bearing member 171 may move along the shaft 130 in the axial direction (that is, the vertical direction with reference to FIG. 1) by interaction between the magnet 141 and the coil 120.

The bearing member 171 may be mounted on an inner circumferential surface of the frame 160. An outer surface of the bearing member 171 may contact the inner circumferential surface of the frame 160 and an inner circumferential surface thereof may contact the shaft 130.

The frame 160 may be spaced apart from the shaft 130 by a predetermined interval.

The inner circumferential surface of the bearing member 171 may have a circular shape so that the bearing member 171 may slidably move along the outer surface of the shaft 130.

Meanwhile, the bearing member 171 together with the magnetic field generation part 140 and the weight body 150 may configure a vibrator that is vibrated relatively to a stator.

As set forth above, according to embodiments of the present invention, a smaller linear vibrator may be obtained by efficiently improving the disposition of components.

Further, there may be provided a linear vibrator capable of immediately stopping vibrations thereof when vibration factors disappear.

While the present invention has been shown and described in connection with the embodiments, it will be apparent to those skilled in the art that modifications and variations can be made without departing from the spirit and scope of the invention as defined by the appended claims.

What is claimed is:

1. A vibration generating device, comprising:
   a housing including an inner space;
   a shaft provided in the inner space of the housing in an axial direction;
   a frame including a shaft hole into which the shaft is inserted;
   a bearing member mounted on the frame to be vibrated in a state of contact with the shaft;
   a vibrating part mounted on an outer surface of the frame and including a magnetic field generation part;
   elastic members mounted on both ends of the vibrating part or the bearing member in the axial direction; and
   a coil provided in the inner space and vibrating the vibrating part by interaction with the magnetic field generation part.

2. The vibration generating device of claim 1, wherein the coil is disposed on an upper or lower portion of the housing in the axial direction.

3. The vibration generating device of claim 1, wherein at least one of both ends of the coil in the axial direction is provided with a yoke formed of a magnetic material.

4. The vibration generating device of claim 1, wherein the coil is provided on an inner surface of the housing to be disposed in the inner space.

5. The vibration generating device of claim 1, wherein the coil includes a first coil and a second coil.

6. The vibration generating device of claim 5, wherein at least one of both ends of the first coil and the second coil in the axial direction is provided with a yoke formed of a magnetic material.

7. The vibration generating device of claim 5, wherein the first coil and the second coil are continuously disposed in the axial direction, and
   the yoke is disposed between the first coil and the second coil.

8. The vibration generating device of claim 1, wherein the bearing member is provided on both ends of the frame.

9. The vibration generating device of claim 1, wherein the bearing member is disposed such that an outer surface thereof contacts an inner circumferential surface of the frame and an inner circumferential surface thereof contacts the shaft.

10. The vibration generating device of claim 1, wherein the vibrating part includes a weight body.

11. The vibration generating device of claim 1, wherein the frame is vibrated in a state of being spaced apart from the shaft by a predetermined interval.

12. The vibration generating device of claim 1, wherein the magnetic field generation part includes a magnet.

13. The vibration generating device of claim 12, wherein at least one of both ends of the magnet is provided with a yoke formed of a magnetic material.

14. A vibration generating device, comprising:
    a housing including an inner space;
    a shaft provided in the inner space of the housing in an axial direction;
    a frame including a shaft hole into which the shaft is inserted;
    a bearing member mounted on the frame to be vibrated in a state of contact with the shaft;
    a vibrating part mounted on an outer surface of the frame and a magnetic field generation part;
    elastic members mounted on both ends of the vibrating part or the bearing member in the axial direction and
    a coil mounted in the inner space and vibrating the vibrating part by interaction with the magnetic field generation part; and
    a vibration stopping unit helping the vibrating part to stop vibrating when current applied to the coil is cut off.

15. The vibration generating device of claim 14, wherein the vibration stopping unit is mounted on at least one end of the coil.

* * * * *